United States Patent
Ziskind et al.

(10) Patent No.: US 10,708,188 B2
(45) Date of Patent: Jul. 7, 2020

(54) APPLICATION SERVICE VIRTUAL CIRCUIT

(71) Applicant: ATC Technologies, LLC, Reston, VA (US)

(72) Inventors: Ilya Ziskind, Sterling, VA (US); David Nance, Sterling, VA (US)

(73) Assignee: ATC TECHNOLOGIES, LLC, Reston, VA (US)

( * ) Notice: Subject to any disclaimer, the term of this patent is extended or adjusted under 35 U.S.C. 154(b) by 0 days.

(21) Appl. No.: 16/264,004

(22) Filed: Jan. 31, 2019

(65) Prior Publication Data
US 2019/0245790 A1    Aug. 8, 2019

Related U.S. Application Data

(60) Provisional application No. 62/625,416, filed on Feb. 2, 2018.

(51) Int. Cl.
| | |
|---|---|
| H04L 25/12 | (2006.01) |
| H04L 12/813 | (2013.01) |
| H04L 12/947 | (2013.01) |
| H04L 12/46 | (2006.01) |
| H04L 12/715 | (2013.01) |
| G06F 9/455 | (2018.01) |
| H04L 12/703 | (2013.01) |
| H04J 1/16 | (2006.01) |

(52) U.S. Cl.
CPC .......... *H04L 47/20* (2013.01); *G06F 9/45558* (2013.01); *H04L 12/4641* (2013.01); *H04L 45/28* (2013.01); *H04L 45/64* (2013.01); *H04L 49/25* (2013.01); *G06F 2009/45595* (2013.01)

(58) Field of Classification Search
CPC ..... H04L 12/4641; H04L 47/20; H04L 49/25; G06F 2009/45595
USPC ........................................ 370/230, 389, 386
See application file for complete search history.

(56) References Cited

U.S. PATENT DOCUMENTS

| | | |
|---|---|---|
| 8,165,156 B1 | 4/2012 | Melsen |
| 9,450,817 B1 | 9/2016 | Bahadur et al. |
| (Continued) | | |

OTHER PUBLICATIONS

PCT/US2019/016081 International Search Report and Written Opinion dated Apr. 29, 2019 (11 pages).

*Primary Examiner* — John Pezzlo
(74) *Attorney, Agent, or Firm* — Michael Best & Friedrich LLP

(57) ABSTRACT

Systems and methods for exchanging data over a network are described. One method includes receiving, from a computing device via a physical network port, a request to forward network traffic, the request including a network domain identifier and a user identifier. The method includes retrieving, from a database storing user information, a user profile based on the user identifier. The method includes determining whether the traffic forwarding request is valid based on the user profile. The method includes, when the traffic forwarding request is valid, provisioning, on the network, an application service virtual circuit between a local virtual port of a communication interface coupled to the electronic processor and a peer port at a remote communication endpoint. The method includes forwarding the network traffic from the computing device to the remote communication end point via the application service virtual circuit.

18 Claims, 3 Drawing Sheets

(56) References Cited

U.S. PATENT DOCUMENTS

| | | |
|---|---|---|
| 2004/0034797 A1 | 2/2004 | Becker Hof |
| 2008/0151906 A1 | 6/2008 | Kolli et al. |
| 2008/0281696 A1* | 11/2008 | Whitehead ............ G06Q 30/02 705/14.41 |
| 2009/0158387 A1 | 6/2009 | Huang |
| 2010/0158017 A1 | 6/2010 | Casey |
| 2011/0231443 A1* | 9/2011 | Hannel ................ H04L 63/105 707/776 |
| 2012/0096159 A1* | 4/2012 | Short ..................... H04L 63/08 709/225 |
| 2012/0170467 A1 | 7/2012 | Bencheck et al. |

* cited by examiner

APPLICATION SERVICE VIRTUAL CIRCUIT

RELATED APPLICATION

The present application claims the benefit of U.S. Provisional Patent Application No. 62/625,416, filed Feb. 2, 2018, the entire contents of which are hereby incorporated by reference.

FIELD

Embodiments described herein relate to controlling data exchange between endpoints in a packet switched network and, more particularly, to methods for provisioning virtual circuits.

SUMMARY

Virtual circuits (for example, VPN tunnels) transport data over packet switched networks. Virtual circuits appear as a dedicated physical layer link between two systems or end points in the network. Network equipment, for example, Layer 2/Layer 3 switches, may be configured to provision, for a physical port, a virtual port, and virtual circuit. The virtual ports and circuits are used by computing devices and other network equipment to transport data across the network. Virtual circuits may be automatically provisioned when a computing device is attached to a physical port on a switch. Such provisioning is based on the network addresses of the end points. However, the virtual circuit is provisioned without performing packet inspection and regardless of the type of traffic presented for forwarding or the identity of the user presenting the traffic. Accordingly, embodiments described herein provide, among other things, systems, devices, and methods for provisioning application service virtual circuits.

In one aspect, a system is provided for exchanging data over a network. The system includes a communication interface coupled to a physical network port; and an electronic processor. The electronic processor is configured to receive, from a computing device via the physical network port, a request to forward network traffic, the request including a network domain identifier and a user identifier. The electronic processor is configured to retrieve, from a database storing user information, a user profile based on the user identifier. The electronic processor is configured to determine whether the traffic forwarding request is valid based on the user profile. The electronic processor is configured to, when the traffic forwarding request is valid, provision, on the network, an application service virtual circuit between a local virtual port of the communication interface and a peer port at a remote communication endpoint. The electronic processor is configured to forward the network traffic from the computing device to the remote communication end point via the application service virtual circuit.

In another aspect, a method is provided for exchanging data over a network. The method includes receiving, from a computing device via a physical network port, a request to forward network traffic, the request including a network domain identifier and a user identifier. The method includes retrieving, from a database storing user information, a user profile based on the user identifier. The method includes determining whether the traffic forwarding request is valid based on the user profile. The method includes, when the traffic forwarding request is valid, provisioning, on the network, an application service virtual circuit between a local virtual port of a communication interface coupled to the electronic processor and a peer port at a remote communication endpoint. The method includes forwarding the network traffic from the computing device to the remote communication end point via the application service virtual circuit.

BRIEF DESCRIPTION OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
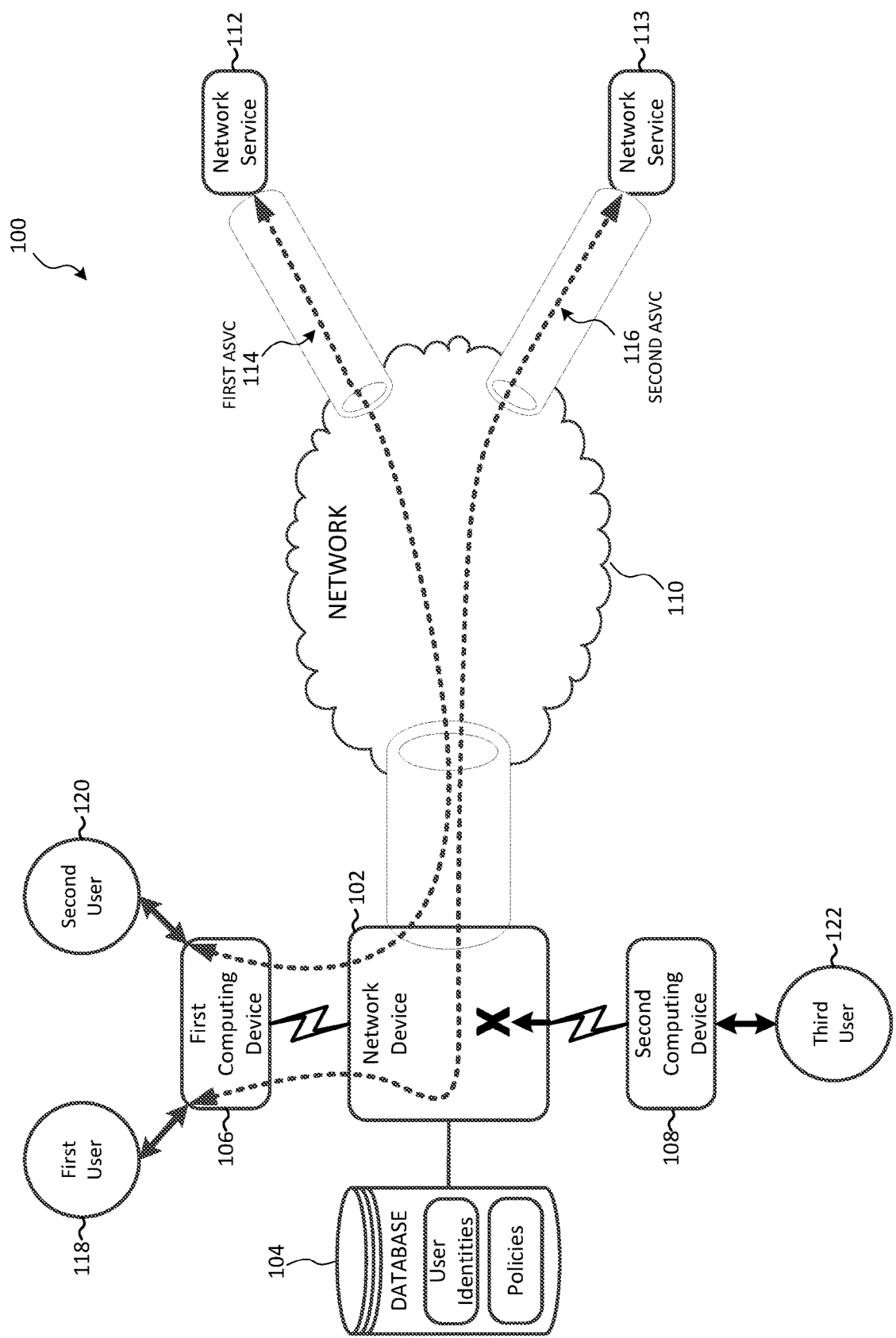
FIG. 1 is a diagram of a network system according to some embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways.

It should also be noted that a plurality of hardware and software based devices, as well as a plurality of different structural components may be used to implement the invention. In addition, it should be understood that embodiments of the invention may include hardware, software, and electronic components or modules that, for purposes of discussion, may be illustrated and described as if the majority of the components were implemented solely in hardware. However, one of ordinary skill in the art, and based on a reading of this detailed description, would recognize that, in at least one embodiment, the electronics based aspects of the invention may be implemented in software (e.g., stored on non-transitory computer-readable medium) executable by one or more processors. As such, it should be noted that a plurality of hardware and software based devices, as well as a plurality of different structural components may be utilized to implement the invention. For example, "control units" and "controllers" described in the specification can include one or more processors, one or more memory modules including non-transitory computer-readable medium, one or more input/output interfaces, and various connections (e.g., a system bus) connecting the components.

For ease of description, each of the exemplary systems or devices presented herein is illustrated with a single exemplar of each of its component parts. Some examples may not describe or illustrate all components of the systems. Other exemplary embodiments may include more or fewer of each of the illustrated components, may combine some components, or may include additional or alternative components.

As used herein, the terms "Layer 1," "Layer 2," "Layer 3," and the like refer to the various layers of the OSI (Open Systems Interconnect) model for networking computing devices.

FIG. 1 is a diagram of an example network system 100. The system 100 includes a network device 102, a database 104, a first computing device 106, a second computing device 108, and a network 110. It should be understood that the system 100 is provided as an example and, in some embodiments, the system 100 includes additional or fewer components. For example, the system 100 may include multiple network devices 102.

The first computing device 106 and the second computing device 108 are communicatively coupled to the network device 102, for example, with a wireless or wired connection, or combinations thereof. The first computing device 106 and the second computing device 108 communicate via the network device 102 and the network 110 to remote devices and services on the network 110, for example, the network services 112, 113.

The network 110 may be a wired or wireless packet switching network or networks, operating according to suitable packet internet protocols (for example, Transmission Control Protocol (TCP), Internet Protocol (IP), and User Datagram Protocol (UDP)). The terms "internet protocol" and "internet protocols," as used herein, may refer to Internet Protocol version 4 (IPv4), Internet Protocol version 6 (IPv6), future-developed internet protocols, or some combination of the foregoing. All or parts of the network 110 may be implemented using one or more existing networks, for example, a cellular network, the Internet, a land mobile radio (LMR) network, a short-range (for example, Bluetooth™) wireless network, a wired or wireless wide area network (WAN), a wireless local area network (for example, Wi-Fi), and a public switched telephone network (PSTN). The network 110 may also include future-developed networks.

Figure 2:
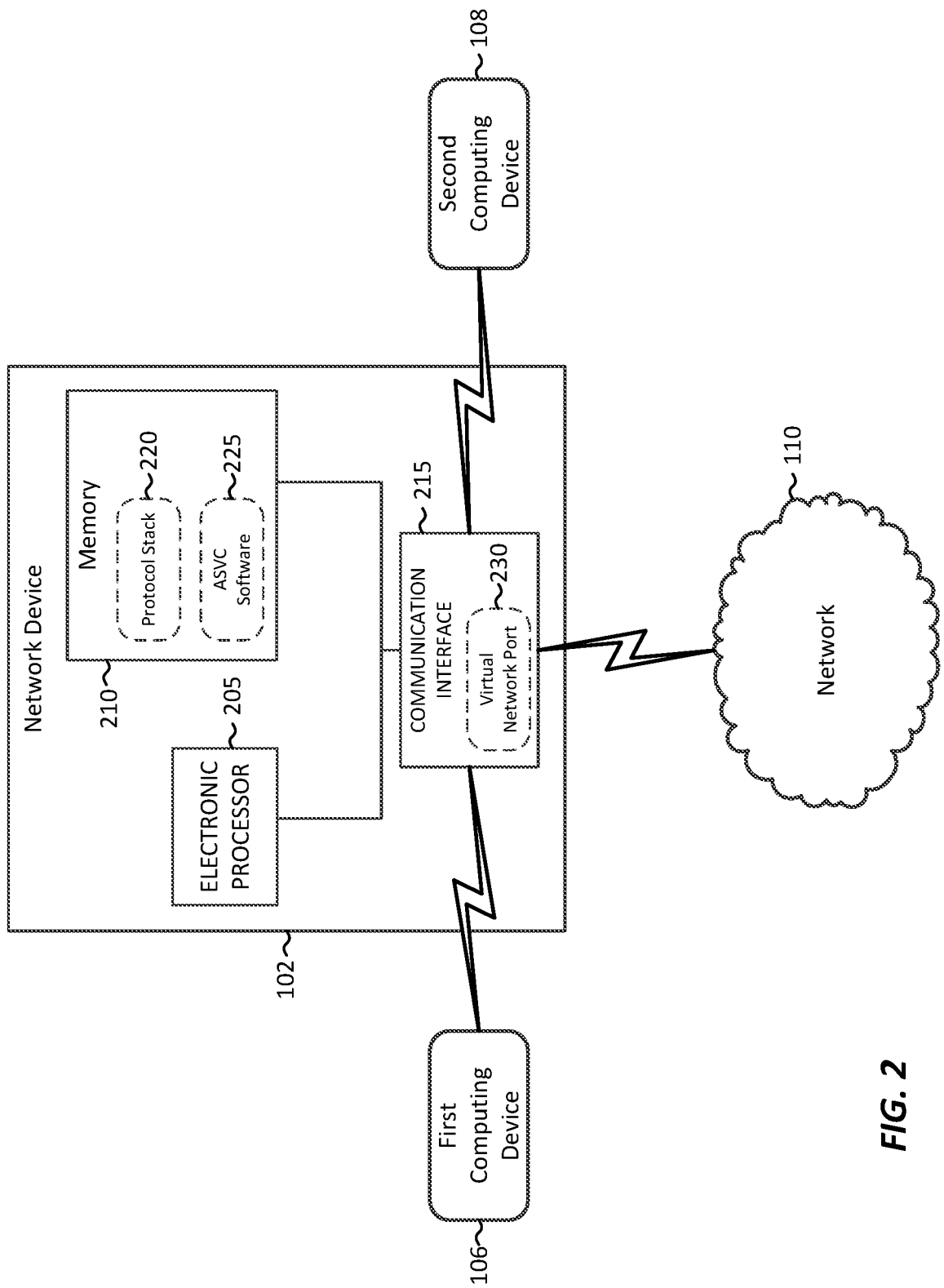
FIG. 2 is a diagram of the network device of the system of FIG. 1 according to some embodiments.

The network device 102, described more particularly below with respect to FIG. 2, is communicatively coupled to, and writes data to and from, the database 104. As illustrated in FIG. 1, the database 104 may be a database housed on a suitable database server communicatively coupled to and accessible by the network device 102. In alternative embodiments, the database 104 may be part of a cloud-based database system external to the system 100 and accessible by the network device 102 over one or more additional networks. In some embodiments, all or part of the database 104 may be locally stored on the network device 102. In some embodiments, as described below, the database 104 electronically stores data on user identities (for example, user profiles) and policies (for example, network security and usage policies).

In some embodiments, the network device 102 is a network switch (for example, a Layer 2/Layer 3 switch). In some embodiments, the network device 102 is a Provider Edge (PE) router. The network device 102 is deployed on the edge of the network 110 and forwards network traffic to and from the first computing device 106, the second computing device 108, and one or more network services 112, 113. The network device 102 may forward network traffic via Layer 2 switching, Layer 3 routing, or a combination of both. The first and second computing devices 106, 108 are network-attached computing devices (including, for example, a processor, memory, and communications interface) such as desktop computers, laptop computers, tablet computers, smart telephones, and the like. The first and second computing devices 106, 108 may also be any electronic device capable of connecting to the network device 102 and communicating as described herein. In some embodiments, the computing devices may be smart devices, for example, smart sensors, home automation devices, and the like.

The network services 112, 113 are services (for example, an application) operating on, for example, a remote server or other computing device located at a communication end point. In some embodiments, the communication end point is a physical or virtual network port provisioned on the device operating the network service. In other embodiments, the communication end point is a network port provisioned on a switch, router, or other network infrastructure device, behind which the network service 112 is located. In some embodiments, the network services 112, 113 are subnetworks, to which the users connect to exchange general data traffic with one or more devices, applications, or services located on the subnetworks.

In some embodiments, network traffic is sent to and from the network services 112, 113 over virtual circuits for example, the first application service virtual circuit (ASVC) 114 and the second application virtual circuit (ASVC) 116. In some embodiments, the application service virtual circuits may be Virtual Private Network (VPN) tunnels, Multiprotocol Label Switching (MPLS) tunnels, TCP connections, or the like. For example, a first user 118 or a second user 120 of the first computing device 106 may wish to communicate with one of the network services 112, 113. As described in detail below, the network device 102 provisions application service virtual circuits, based on information retrieved from the database 104, with the network services 112, 113 to enable secure communication therebetween. Application service virtual circuits are provisioned between a virtual network port on the network device and a peer virtual network port on a remote communication endpoint. In some embodiments, the electronic processor 205 defines application service virtual circuits between end points located in different Layer 2 segments (broadcast domains) that are linked by a Layer 3 (routing) function. In some embodiments, the electronic processor 205 defines application service virtual circuits between endpoints located in the Layer 2 segment (for example, the same VLAN).

As described in detail below, the network device 102 may block some traffic and refuse to create an application service virtual circuit. For example, a third user 122 of the second computing device 108 may be unable to pass network traffic, based on information retrieved from the database 104. In such embodiments, an application service virtual circuit to the destination is not built and the network traffic from the second computing device 108 does not pass deeper into the network than the port of the network device 102, to which the second computing device 108 is connected. The request to create the application service virtual circuit is received by the port, but the request is denied.

FIG. 2 illustrates an example of the network device 102. In the embodiment illustrated, the network device 102 includes an electronic processor 205, a memory 210, and a communication interface 215. The illustrated components, along with other various modules and components are coupled to each other by or through one or more control or data buses that enable communication therebetween.

The electronic processor 205 obtains and provides information (for example, from the memory 210 and/or the communication interface 215), and processes the information by executing one or more software instructions or modules, capable of being stored, for example, in a random access memory ("RAM") area of the memory 210 or a read only memory ("ROM") of the memory 210 or another non-transitory computer readable medium (not shown). The software can include firmware, one or more applications, program data, filters, rules, one or more program modules, and other executable instructions. The electronic processor 205 is configured to retrieve from the memory 210 and execute, among other things, software related to the control processes and methods described herein.

The memory 210 can include one or more non-transitory computer-readable media, and includes a program storage area and a data storage area. As used in the present application, "non-transitory computer-readable media" comprises all computer-readable media but does not consist of a transitory, propagating signal. The program storage area and the data storage area can include combinations of different types of memory, as described herein. In the embodiment illustrated, the memory 210 stores, among other things, a network protocol stack 220 and application service virtual circuit software 225. The electronic processor 205 executes the network protocol stack 220, which operates according to internet protocols (for example, transmission control protocol/internet protocol (TCP/IP)) to enable communications between the network device 102 and other network elements, via the communication interface 215. As can be appreciated by one skilled in the art, the network protocol stack 220 operates using layers (for example, as specified in the Internet Engineering Task Force (IETF) Request for Comments (RFC) 1122 or the OSI Model). The electronic processor 205 executes the application service virtual circuit software 225 as described herein to provision application service virtual circuits.

The electronic processor 205 controls the communication interface 215 to send and receive data over the network 110 (for example, using Layer 2 switching, Layer 3 routing, or a combination of both). The communication interface 215 may include one or more wireless transmitters or transceivers for wirelessly communicating over the network 110. Alternatively or in addition to wireless transmitters or transceivers, the communication interface 215 may include one or more physical network ports for receiving cable, such as Ethernet cables, for communicating over the network 110 or with the first and second computing devices 106, 108 over dedicated wired connections. As illustrated in FIG. 2, the communication interface 215 may also include one or more virtual interfaces (for example, a virtual network port 230).

Figure 3:
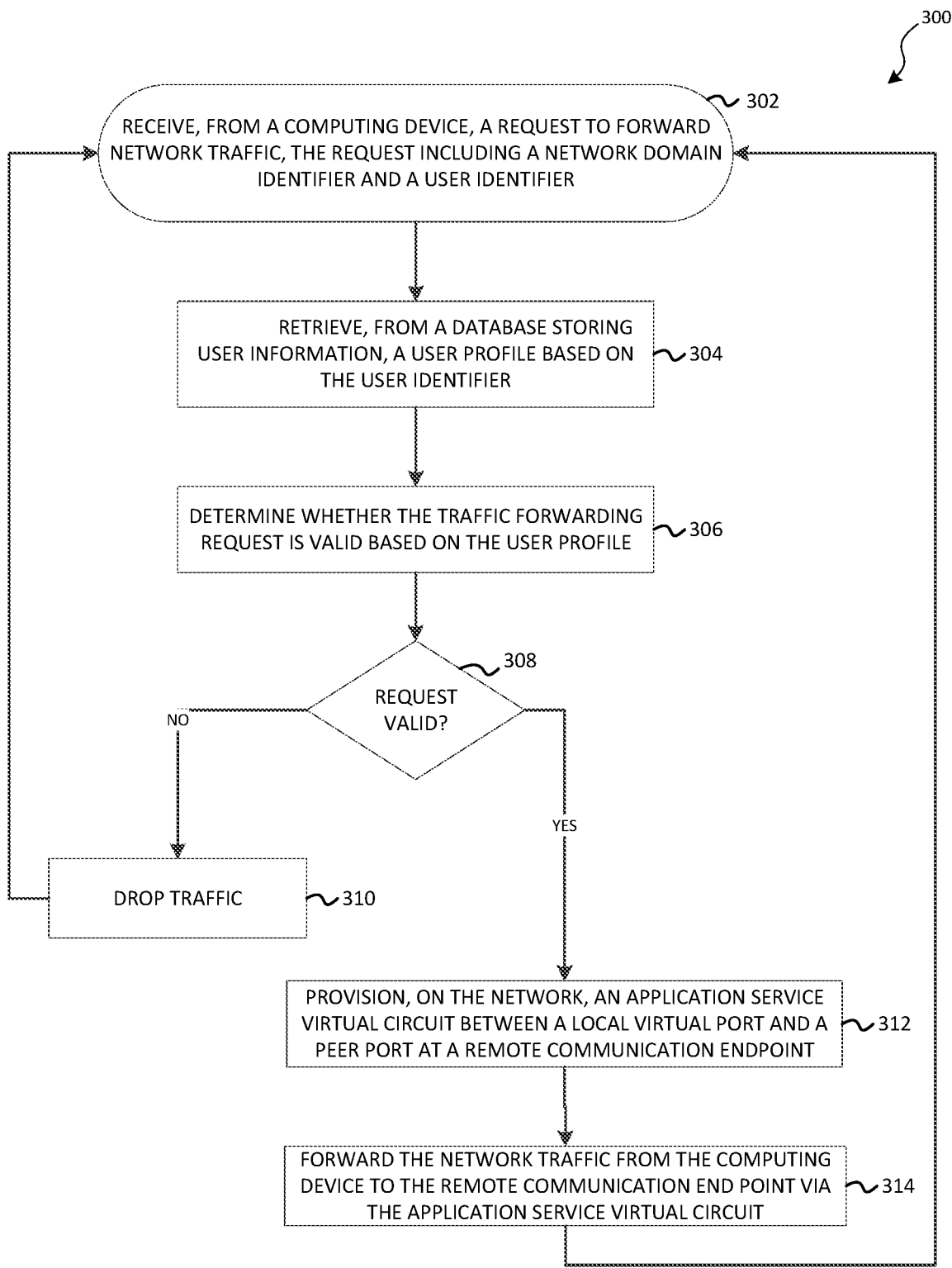
FIG. 3 is a flow chart illustrating a method of operating the network system of FIG. 1 according to some embodiments.

As noted above, current virtual circuit provisioning methods focus only on communication end points and network addresses, and are thus inadequate for providing security based on user identities, network policies, and the like. Accordingly, methods are provided herein to establish virtual circuits based on user identities or network policies. For example, FIG. 3 illustrates an example method 300 for exchanging data over a network. The method 300 is described as being performed by network device 102 and, in particular, the electronic processor 205. However, it should be understood that in some embodiments, portions of the method 300 may be performed external to the network device 102, for example, by other computing or networking devices.

As an example, the method 300 is described in terms of a single computing device communicating with a single network service. However, it should be understood that embodiments of the method 300 may be implemented to accommodate multiple computing devices communicating with multiple network services.

At block 302, the electronic processor 205 receives, from a computing device, a request to forward network traffic. For example, the first user 118 may request access to the network service 112 (for example, an application). In should be noted that embodiments of the method 300 are explained in terms of "users," "user identifiers," and "user profiles." It should be understood that these terms may refer to human users or they may refer to computing devices, applications, services, or the like. For example, in some embodiments, the first user 118 may be a human user requesting access via a mobile computing device. In other embodiments, the first user 118 may be a computing device requesting access to automatically transmit data. In some embodiments, the request includes at least a network domain identifier and a user identifier. The network domain identifier indicates the network service to which the user is requesting access. The user identifier is a unique identifier indicating the identity of the user making the request. In some embodiments, the request is a network message, a signaling protocol message, or the like. Although the network request may include network traffic (for example, data packets) intended for the network service 112, the network traffic is buffered (or dropped) at ingress and not transmitted to the network 110 unless the request is validated, as described below.

Accordingly, at block 304, the electronic processor 205 retrieves, from the database 104, a user profile based on the user identifier. The user profile includes data relating to the user and the user's preferences, for example, identifying information for the user, application settings, and the like. The user profile may also include security settings and credentials for the user, for example, limits on what the user is allowed to access and when, or limits on what sorts of network traffic the user is allowed to transmit or receive.

At block 306, the electronic processor 205 determines whether the traffic forwarding request is valid based on the user profile. For example, the user profile may indicate that the user is allowed to access the network service 112. In such case, the traffic forwarding request is considered valid. In some embodiments, the electronic processor 205 determines whether the traffic forwarding request is valid based on the user profile and the network domain identifier. For example, the user profile may indicate that the user is allowed to access the network service specified by the network domain identifier. In some embodiments, the electronic processor 205 determines whether the traffic forwarding request is valid based on the content of the network traffic (rather than just the transport-level parameters associated with stateful packet inspection capabilities). For example, the electronic processor may perform deep packet inspection on the network traffic to determine the content. In some embodiments, the electronic processor 205 retrieves, from the database 104, a network traffic policy. The network traffic policy may indicate what types of content are allowable. For example, HTTPS traffic may be allowed, while HTTP traffic is not allowed. In another example, video traffic may not be allowed, while audio traffic is allowed. In another example, only certain types of application data transactions (for example, financial transactions) are allowed or disallowed. In another example, the content may need to be in a particular language in order to be allowed. In another example, content may need to relate to a particular topic or area of concern in order to be allowed. In another example, network traffic is only allowed during certain times (for example, off-peak hours) or at certain rates (for example, a bandwidth or an aggregate total). Regardless of the particular policy, in such embodiments, the electronic processor 205 determines whether the traffic forwarding request is valid based on the content and the network traffic policy.

In some embodiments, the electronic processor 205 determines whether the traffic forwarding request is valid based on sender or recipient identities and the sending or receiving application, in addition to the network addresses or network protocols involved in the request. For example, a first user of a portable computer may be assigned an IP address of 192.168.100.17, and attempt to use Internet Explorer™ to access http://news.google.com. In one example profile, this request is valid, while a second request from a second user using the same portable computer to access the same URL with a different browser (for example, Firefox™) is invalid. In another example, a request from a smart vending machine using a first software application to send an SNMP trap to a particular application served from a particular URL is valid, while a second identical request from the same machine is invalid because it is being made from a second software application (for example, a hacked version of the first software application).

In some embodiments, the virtual port and the application service virtual circuit are linked to the identity of the user that requested the connection. In such embodiments, multiple user requests result in the creation of multiple virtual ports and application service virtual circuits, assuming the requests are validated.

At block 308, when the traffic forwarding request is invalid, the electronic processor 205 drops the network traffic, at block 310. For example, the user profile may indicate that the user is allowed to access the network service 112. In such case, the traffic forwarding request is considered invalid. In some embodiments, the electronic processor 205 drops all network traffic not associated with the network service 112. Similarly, in some embodiments, any traffic received that is not a request to create an application service virtual circuit or destined for an existing application service virtual circuit is dropped.

At block 308, when the traffic forwarding request is valid, at block 312, the electronic processor 205 provisions, on the network 110, an application service virtual circuit. The application service virtual circuit is established between a local virtual port on the network device and a peer port at a remote communication endpoint for the network service 112. In some embodiments, the peer port is also a virtual network port.

At block 314, the electronic processor 205 forwards the network traffic from the computing device to the remote communication end point via the application service virtual circuit (provisioned at block 312). In some embodiments, the electronic processor 205 encrypts the network traffic that traverses the application service virtual circuit.

In some embodiments, the network traffic is accompanied by periodic re-transmissions of the traffic forwarding request and the traffic content is continually analyzed for validity. In such embodiments, the application service virtual circuit is kept active as long as the user identity and the traffic content are valid. The electronic processor 205 may deactivate the application service virtual circuit if either the user identity or the traffic content is no longer valid, or if a timeout period expires without receiving another traffic forwarding request. Malicious users are thereby prevented from simply taking over the physical port (for example, by removing an authenticated computing device and replacing it with their own) where the application service virtual circuit is provisioned to gain access to the network services.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

Various features and advantages of some embodiments are set forth in the following claims.

What is claimed is:

1. A system for exchanging data over a network, the system comprising:
   a communication interface coupled to a physical network port; and
   an electronic processor, coupled to the communication interface and configured to
      receive, from a computing device via the physical network port, a traffic forwarding request to forward network traffic, the request including a network domain identifier and a user identifier;
      retrieve, from a database storing user information, a user profile based on the user identifier;
      perform deep packet inspection on the network traffic to determine a content;
      retrieve, from the database, a network traffic policy;
      determine whether the traffic forwarding request is valid based on the user profile, the content, and the network traffic policy; and
      when the traffic forwarding request is valid
         provision, on the network, an application service virtual circuit between a local virtual port of the communication interface and a peer port at a remote communication endpoint; and
         forward the network traffic from the computing device to the remote communication end point via the application service virtual circuit.

2. The system for exchanging data over a network of claim 1, wherein the electronic processor is further configured to, when the traffic forwarding request is invalid, drop the network traffic.

3. The system for exchanging data over a network of claim 1, wherein the electronic processor is further configured to provision the application service virtual circuit based on the network domain identifier and the user identifier.

4. The system for exchanging data over a network of claim 1, wherein the electronic processor is further configured to determine whether the traffic forwarding request is valid based further on the network domain identifier.

5. The system for exchanging data over a network of claim 1, wherein the electronic processor is further configured to determine whether the traffic forwarding request is valid based further on at least one selected from the group consisting of a sender identity, a recipient identity, a sending application, and a receiving application.

6. The system for exchanging data over a network of claim 1, wherein the user profile includes at least one selected from the group consisting of identifying information for the user, application settings, security settings for the user, and security credentials for the user.

7. The system for exchanging data over a network of claim 1, wherein the electronic processor is further configured to encrypt the network traffic.

8. The system for exchanging data over a network of claim 1, wherein the electronic processor is further configured to
receive, from a computing device via the physical network port, a second request to forward network traffic;
determine whether the traffic forwarding request is valid; and
when the traffic forwarding request is valid
continue forwarding the network traffic from the computing device to the remote communication end point via the application service virtual circuit.

9. The system for exchanging data over a network of claim 8, wherein the electronic processor is further configured to, when the traffic forwarding request is invalid, deactivate the application service virtual circuit and drop the network traffic.

10. A method for exchanging data over a network, the method comprising:
receiving, from a computing device via a physical network port, a traffic forwarding request to forward network traffic, the request including a network domain identifier and a user identifier;
retrieving, from a database storing user information, a user profile based on the user identifier;
performing deep packet inspection on the network traffic to determine a content;
retrieving, from the database, a network traffic policy;
determining whether the traffic forwarding request is valid based on the user profile, the content, and the network traffic policy; and
when the traffic forwarding request is valid
provisioning, on the network, an application service virtual circuit between a local virtual port of a communication interface coupled to the electronic processor and a peer port at a remote communication endpoint; and
forwarding the network traffic from the computing device to the remote communication end point via the application service virtual circuit.

11. The method for exchanging data over a network of claim 10, further comprising:
when the traffic forwarding request is invalid, dropping the network traffic.

12. The method for exchanging data over a network of claim 10, further comprising:
provisioning the application service virtual circuit based on the network domain identifier and the user identifier.

13. The method for exchanging data over a network of claim 10, wherein determining whether the traffic forwarding request is valid includes determining whether the traffic forwarding request is valid based on the network domain identifier.

14. The method for exchanging data over a network of claim 10, wherein determining whether the traffic forwarding request includes determining whether the traffic forwarding request based further on at least one selected from the group consisting of a sender identity, a recipient identity, a sending application, and a receiving application.

15. The method for exchanging data over a network of claim 10, wherein retrieving a user profile includes retrieving at least one selected from the group consisting of identifying information for the user, application settings, security settings for the user, and security credentials for the user.

16. The method for exchanging data over a network of claim 10, further comprising:
encrypting the network traffic.

17. The method for exchanging data over a network of claim 10, further comprising:
receiving, from a computing device via the physical network port, a second request to forward network traffic;
determining whether the traffic forwarding request is valid; and
when the traffic forwarding request is valid
continuing to forward the network traffic from the computing device to the remote communication end point via the application service virtual circuit.

18. The method for exchanging data over a network of claim 17, further comprising:
when the traffic forwarding request is invalid, deactivating the application service virtual circuit and dropping the network traffic.

* * * * *